H. L. DE ZENG.
SCHEMATIC EYE.
APPLICATION FILED MAR. 5, 1910.
971,026.
Patented Sept. 27, 1910.
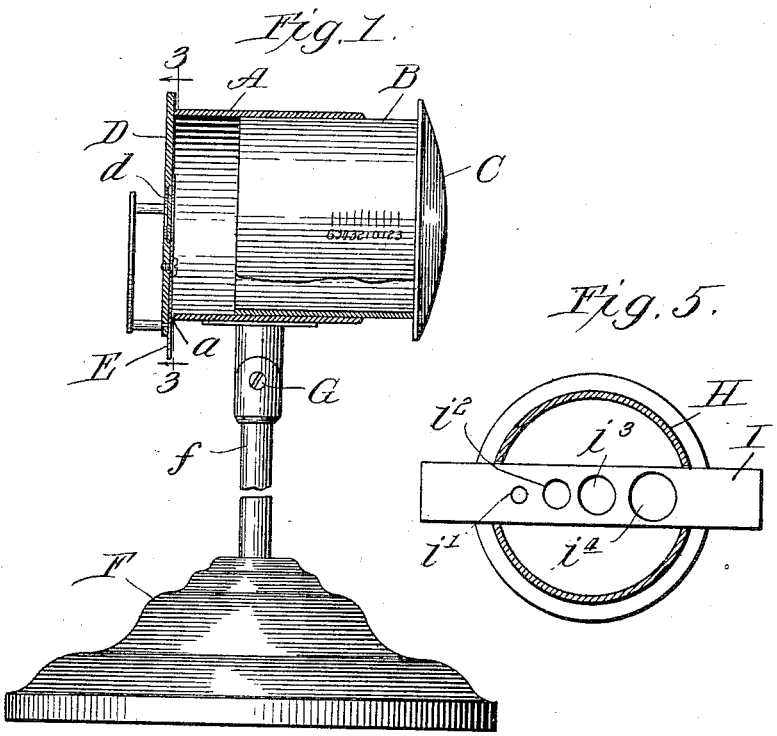
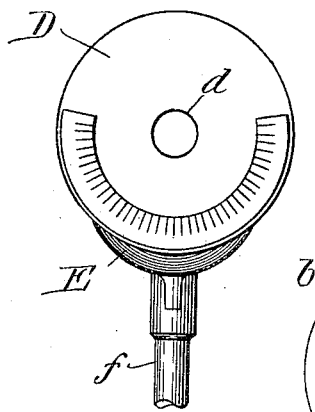
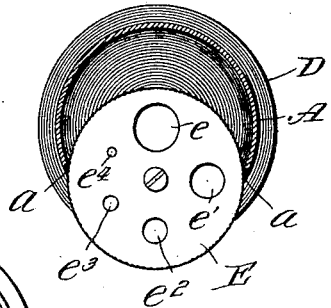
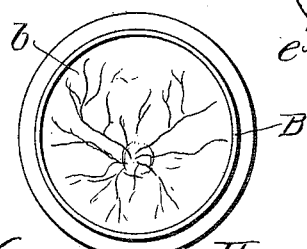
Witnesses:
Harry S. Gaither
Arnold E. Freudenreich
Inventor:
Henry L. De Zeng
by Chamberlin & Freudenreich
attys

UNITED STATES PATENT OFFICE.

HENRY L. DE ZENG, OF PHILADELPHIA, PENNSYLVANIA, ASSIGNOR TO DE ZENG-STANDARD COMPANY, OF PHILADELPHIA, PENNSYLVANIA, A CORPORATION OF NEW JERSEY.

SCHEMATIC EYE.

971,026.  Specification of Letters Patent.  Patented Sept. 27, 1910.

Application filed March 5, 1910. Serial No. 547,451.

*To all whom it may concern:*

Be it known that I, HENRY L. DE ZENG, a citizen of the United States, residing at Philadelphia, county of Philadelphia, State of Pennsylvania, have invented a certain new and useful Improvement in Schematic Eyes, and declare the following to be a full, clear, and exact description of the same, such as will enable others skilled in the art to which it pertains to make and use the same, reference being had to the accompanying drawings, which form a part of this specification.

My invention relates to a mechanical device representing an adjustable eye and has for its object to provide a simple and convenient arrangement of parts whereby the effective size of the pupil opening may be varied.

The various features of novelty whereby my invention is characterized will hereinafter be pointed out with particularity in the claims; but for a full understanding of my invention and of its object and advantages reference may be had to the following detailed description taken in connection with the accompanying drawings, wherein;

Figure 1 shows my improved device partly in side elevation and partly in section; Fig. 2 is a front view the base being omitted; Fig. 3 is a section taken on line 3—3 of Fig. 1 looking in the direction of the arrows; and Fig. 4 is a view of the right hand telescoped members in Fig. 1 looking toward the right; Fig. 5 is a view like Fig. 4, showing a modification.

Referring to the drawings A represents the usual cylindrical shell or casing and B a coöperating shell or casing in telescoped relation thereto. The member B is provided with a concave end wall C upon the inner surface of which is a representation of the normal fundus $b$. The front end of the casing A is closed by an end wall D which has in the center thereof an opening $d$ corresponding to the pupil of the eye. The members A and B are relatively movable in the axial direction so as to vary the distance between the pupil opening and the eye ground carried by the member B. In order that the effective size of the pupil opening may be varied I associate with the casing a movable member provided with a series of openings differing in size, the parts being so arranged that either of the openings may be brought into registration with the opening $d$. This movable member may take any suitable form, preferably that of a disk as indicated at E, pivotally mounted upon the front wall of the casing in any suitable manner so as to over-lap the opening $d$. The disk is provided with a series of openings varying in size and distributed about the center of the disk, these openings being indicated at $e$, $e'$, $e^2$, $e^3$, and $e^4$. The opening $e$ may be substantially as large as or larger than the opening $d$, while the other openings of the series gradually decrease in size. It will be seen that by rotating the disk any one of the series of openings may be brought into registration with the opening $d$ so that the effective size of the pupil opening in the device may be varied as desired. The lens for focusing the rays upon the eye ground may be mounted in any one of the pupil openings. If mounted in the opening $d$ only a single lens will be required while if it is desired to have the lens on the disk, it is necessary to provide a separate lens for each of the openings in the disk; and therefore the simpler arrangement is that wherein a single lens is employed and it is mounted in the opening in the stationary member. The disk is preferably mounted upon the inner face of the end wall of the casing, a portion thereof projecting outwardly beyond the casing through a slot $a$ and the edge of the disk being knurled or otherwise roughened so as to make it easy to turn the disk.

The device may be mounted upon a suitable base F in any suitable way, preferably by pivoting the casing to the upper end of a standard $f$ as at G.

In Fig. 5 I have illustrated a modification in which the variation in the effective size of the pupil opening is effected by means of a slide instead of a revoluble disk. Referring to this figure, H represents the casing corresponding to the casing A. I is a slide mounted in the casing and having a series of openings $i'$ to $i^4$ graduated as to size. By shifting the slide laterally either one of the openings therein may be brought into registration with a pupil opening similar to that shown in the other form.

My invention is intended for use by students in the study of the eye. When students first begin in the use of the opthalmoscope or retinoscope on the living eye, they usually are unable to see anything and it is therefore necessary to make use of some mechanical device, representing the eye, which will afford a view. In order that a student obtain a good view it is necessary to provide the mechanical device, or schematic eye, with a very large pupil opening. The large pupil opening answers very well for a beginner, but it does not permit the student to work under the conditions actually encountered in the living eye where the size of the pupil opening constantly varies. In short, the use of the maximum pupil opening in the schematic eye does not enable the student to train himself to make correct measurements upon a living eye or even to see into the living eye. By arranging the schematic eye in accordance with my invention it is possible for a student to secure training under varying conditions of the pupil opening, beginning with an opening many times larger than that of the living eye and gradually decreasing in size until a point is reached which permits the student to train himself to look into a living eye.

It will be seen that the member for adjusting the pupil opening is arranged in rear of the lens, just as the iris is placed beneath the cornea in the living eye. This feature enables a student to bring himself into contact with just those conditions which he will meet on his first attempts in practice on a living eye.

While I have illustrated and described with particularity only a single form of my invention I do not desire to be limited thereto; but intend covering all constructions and arrangements which fall within the terms employed in the definitions of my invention constituting the appended claims.

What I claim is:

1. In combination, a chamber carrying a representation of an eye ground on one of its walls, and a pupil opening in another of its walls, a movable member mounted adjacent to the said pupil opening having two or more openings of different sizes therein adapted to be brought successively into registration with the said pupil opening and a lens in one of the said openings.

2. In combination, a chamber adapted to carry a picture of an eye ground, a pupil opening in one of its walls, a movable member mounted adjacent to the said pupil opening having a series of apertures therein of different sizes adapted to be brought successively into registration with the said pupil opening and a lens in the said pupil opening.

3. In combination, a representation of an eye ground, a light screen, a pupil opening in the said light screen for admitting light to the said eye ground, a lens in said pupil opening, an adjustable member mounted adjacent to the said pupil opening having a series of different size apertures therein which will register successively with the said pupil opening and thus vary the effective size of the said pupil opening.

4. In combination, a casing carrying a representation of a retina on one of its walls, another of its walls being provided with a pupil opening, a disk pivoted adjacent to said pupil opening and having therein a series of openings of different sizes so located that they will register successively with said pupil opening when the disk is rotated, and a lens in one of said openings.

5. In combination, a chamber carrying a representation of a retina on one of its walls, and having a pupil opening in another of its walls in line with the said retina, a disk pivotally mounted on the latter wall, said disk having a series of openings of different sizes so located that they will register successively with said pupil opening when the disk is rotated, and a lens in the said pupil opening.

6. In combination, a chamber adapted to carry a picture of an eye ground, said chamber having a pupil opening in one of its walls, a movable member mounted adjacent to said pupil opening and between said opening and said picture and having a series of apertures therein of different sizes adapted to be brought successively into registration with the said pupil opening.

7. In combination, a chamber adapted to carry a picture of an eye ground, said chamber having a pupil opening in one of its walls, a movable member mounted adjacent to said pupil opening and between said opening and said picture and having a series of apertures therein of different sizes adapted to be brought successively into registration with the said pupil opening, and a lens in said pupil opening.

In testimony whereof, I sign this specification in the presence of two witnesses.

HENRY L. DE ZENG.

Witnesses:
 WHARTON STOCKTON MCILVAINE,
 MARY AGNES MCGINTY.